(12) United States Patent
Dudovich

(10) Patent No.: US 9,552,522 B2
(45) Date of Patent: Jan. 24, 2017

(54) COUNTING AND MONITORING METHOD USING FACE DETECTION

(71) Applicant: Verint Systems Ltd., Herzilya Pituach (IL)

(72) Inventor: Boaz Dudovich, Rehovot (IL)

(73) Assignee: VERINT SYSTEMS LTD., Herzilya Pituach (IL)

( * ) Notice: Subject to any disclaimer, the term of this patent is extended or adjusted under 35 U.S.C. 154(b) by 0 days.

(21) Appl. No.: 14/593,144

(22) Filed: Jan. 9, 2015

(65) Prior Publication Data

US 2015/0199575 A1 Jul. 16, 2015

Related U.S. Application Data

(60) Provisional application No. 61/926,303, filed on Jan. 11, 2014.

(51) Int. Cl.
*G06K 9/00* (2006.01)
*H04N 5/225* (2006.01)

(52) U.S. Cl.
CPC ....... *G06K 9/00778* (2013.01); *G06K 9/00295* (2013.01)

(58) Field of Classification Search
USPC ............... 382/100, 103–107, 115, 118, 151, 155,382/162, 168, 173, 181, 189, 199, 209, 219,382/224, 232, 254, 274, 276, 286–291, 305,382/312, 321; 707/756; 348/150, 170; 705/7.28
See application file for complete search history.

(56) References Cited

U.S. PATENT DOCUMENTS

| | | | |
|---|---|---|---|
| 2006/0140455 A1* | 6/2006 | Costache | G06F 17/30259 382/118 |
| 2009/0089107 A1* | 4/2009 | Angell | G06Q 10/00 705/7.28 |
| 2011/0231419 A1* | 9/2011 | Papke | G06F 17/30793 707/756 |
| 2013/0182114 A1* | 7/2013 | Zhang | H04N 7/18 348/150 |
| 2013/0195316 A1* | 8/2013 | Bataller | G06K 9/00255 382/103 |

\* cited by examiner

*Primary Examiner* — Seyed Azarian
(74) *Attorney, Agent, or Firm* — Meunier Carlin & Curfman

(57) ABSTRACT

Video is often used to count and identify people entering and exiting an area, such as a store. This information may be used to determine the number and amount of time people are in the area, and other statistics and characteristics. These variables may be skewed by the associates employed or working in the area, instead of patrons or others. The present disclosure is directed to method for eliminating associates from video by facial analysis and the application of analytics.

17 Claims, 4 Drawing Sheets

COUNTING AND MONITORING METHOD
USING FACE DETECTION

CROSS-REFERENCE TO RELATED
APPLICATION

This application claims priority to U.S. Provisional Patent Application No. 61/926,303, filed Jan. 11, 2014, entitled "Counting and Monitoring Method to Determine Groups of Related People," which is incorporated herein by reference in its entirety.

BACKGROUND

Video systems are often used in security, surveillance, and monitoring applications. In these applications, video is often used to count and identify people entering and exiting an area, such as a store. This information may be used to determine the number and amount of time people are in the area, among other statistics and information. These variables may be skewed by the associates employed or working in the area, instead of patrons or others.

SUMMARY

In accordance with the present disclosure, there is provided a method for detecting a person. The method may include providing a video source at a predetermined location to capture video containing people passing through a field of view of the video source at the predetermined location; providing the video to an analytics component to determine at least one bodily characteristic of each person passing through the field of view of the video source; storing an image of each person in a database; and determining if each person is a customer or store associate.

It should be understood that the above-described subject matter may also be implemented as a computer-controlled apparatus, a computer process, a computing system, or an article of manufacture, such as a computer-readable storage medium.

In accordance with the present disclosure, there is also provided a method for detecting a person. The method may include providing a video source at a predetermined location to capture video containing people passing through a field of view of the video source at the predetermined location; providing the video to an analytics component to determine bodily characteristics of the people passing through the field of view of the video source to determine a face of each person in the video; storing an image of the face of each person in a database; and providing a face album to a user interface, the face album presenting plural images, each of the plural images being of a unique face retrieved from the database.

Other systems, methods, features and/or advantages will be or may become apparent to one with skill in the art upon examination of the following drawings and detailed description. It is intended that all such additional systems, methods, features and/or advantages be included within this description and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Video systems are often used in security, surveillance, and monitoring applications. In these applications, video is often used to count and identify people entering and exiting an area, such as a store. This information may be used to determine the number and amount of time people are in the area. These variables may be skewed by the associates employed or working in the area, instead of patrons or others.

Figure 1:
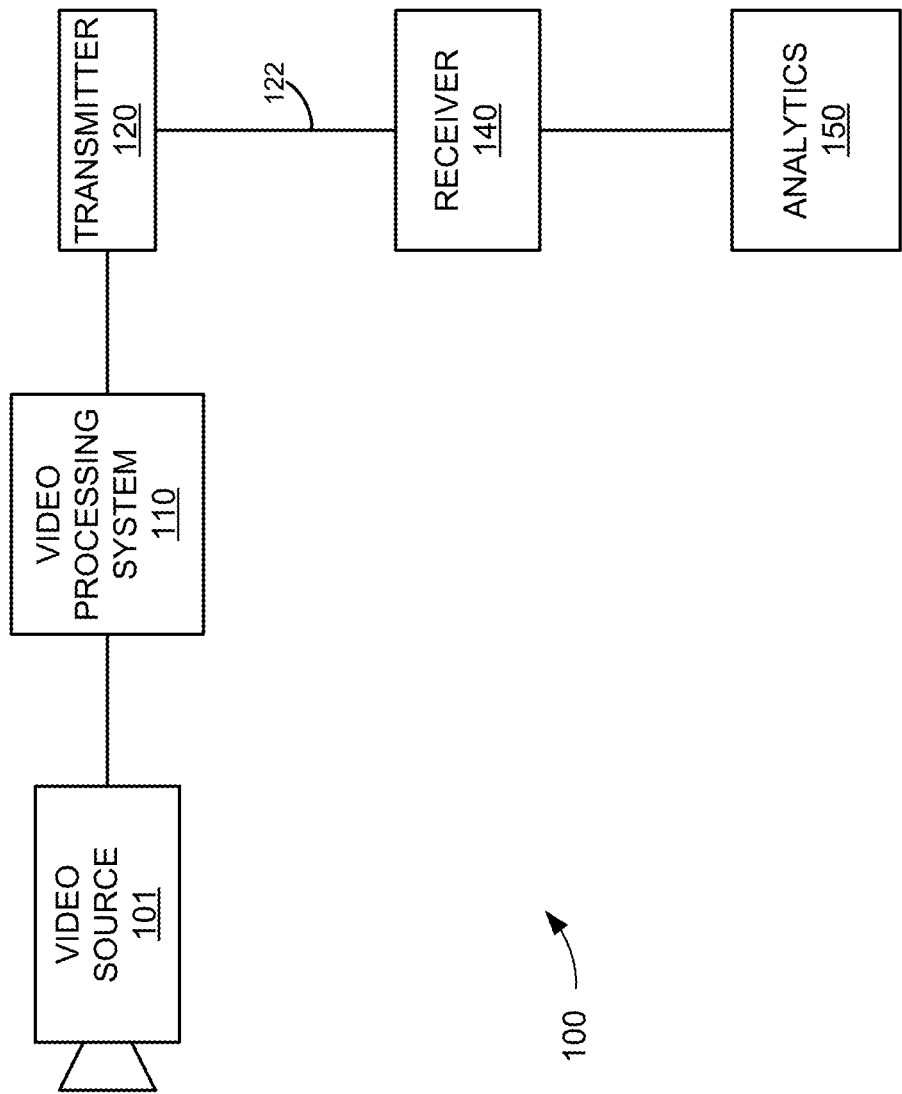
FIG. 1 illustrates a video system.

FIG. 1 illustrates an example high-level overview of components within a video system 100. The video system 100 comprises video source 101, video processing system 110, transmitter 120, and receiver 140. Video processing system 110 receives video from video source 101 and transmits it to receiver 140 over communication link 122 using transmitter 120. System 100 may be used to carry out the methods described herein.

The video source 101 may comprise any device having the capability to capture video or images. The video source 101 comprises circuitry and an interface for transmitting video or images. The video source 101 may be the device which performs the initial optical capture of video or may be an intermediate transfer device. For example, the video source 101 may be a video camera, still camera, internet protocol (IP) camera, video switch, video buffer, video server, or other video transmission device, including combinations thereof.

The video processing system 110 may comprise any device for processing and transferring video, video streams, or images. The video processing system 110 comprises processing circuitry and an interface for receiving and transmitting video. The video processing system 110 is capable of performing one or more processes on video received from the video source 101 or other sources. The processes performed on the video may include processes to generate reduced quality instantiations of the video.

The video processing system 110 may also comprise additional interfaces for transmitting or receiving video, a user interface, memory, software, communication components, power supply, or structural support. The video processing system 110 may be a video analytics system, video management system, server, computing system, or some other type of processing device, including combinations thereof. It should be understood that the functions of the video processing system 110 may be integrated into the video source 101, performed by other devices, or a combination thereof.

The communication link 122 comprises a medium for transmitting data. The medium of communication link 122 may be metal, air, space, glass, plastic, or combinations thereof. Communication link 122 may be a wireless link in which data is transmitted using RF signals. Communication link 122 could use various communication protocols, such as TDM, IP, Ethernet, telephony, optical networking, hybrid fiber coax (HFC), communication signaling, wireless protocols, or some other communication format, including combinations thereof. Communication link 122 may be a direct link or could include intermediate networks, systems, or devices.

Transmitter 120 comprises any device having communication connectivity with hardware and circuitry programmed to function as a telecommunications device and transmit data over communication link 122. Transmitter 120 may also comprise additional interfaces for transmitting or receiving data, a user interface, antenna, memory, software, other communication components, power supply, or structural support. Transmitter 120 may be a network card, wireless transceiver, RF modulator, or other communication device, including combinations thereof. It should be understood that the functions of transmitter 120 may be integrated into video source 101, video processing system 110, performed by other devices, or a combination thereof.

Receiver 140 may comprise any device having communication connectivity with hardware and circuitry programmed to function as a telecommunication device and receive data over communication link 122. Receiver 140 may also comprise additional interfaces for transmitting or receiving data, a user interface, antenna memory, software, other communication components, power supply, or structural support. Receiver 140 may be a network card, telephone, wireless transceiver, RF demodulator, or other communication device, including combinations thereof. The functions of receiver 140 may be integrated into other devices including a computer, a video management system, a storage system, and a digital video recorder.

An analytics component 150 is provided to detect events within captured video and images and to provide alerts associated with the video sources 101. The analytics component 150 applies various algorithms to captured structured and unstructured video to determine the existence of items of interest in the video (e.g., people's faces, as described below). The analytics component 150 may provide automatic scene learning, through which it can detect, recognize and assess actions or behaviors captured by the video sources 101. The analytics component 150 may distill and prioritize relevant video, and apply analytics rules based on policies and environments.

In an aspect of the present disclosure, the system 100 may be used in conjunction with the analytics component 150 in a retail environment to measure sales opportunities to help determine how effectively advertising and marketing programs attract prospective buyers into their store and how successfully they convert potential buyers into customers. The above may be accomplished by, e.g., counting people in the video and/or images captured by the video sources 101. In particular, video and/or images from the video sources 101 may be provided it to the analytics component 150 to apply real-time analytics on customer behaviors and patterns. This information may be used to gain insight for proactively engaging shoppers and increasing sales conversions. For example, the system 100 may provide people counts while detecting traffic patterns and point-of-sale transactions by day of the week and time of day. That information may be used to, e.g., adjust store layout and design, changing merchandising techniques, repositioning store associates and signage, and more.

In an implementation, the video sources 101 may be standard analog or IP video cameras. The analytics component 150 may look for human features in the video and/or images, such as hair and eyes. Detecting these features improves accuracy, as inanimate objects such as shadows and shopping carts are not detected as people. In some implementations, the analytics component may distinguish individual shoppers entering a store from "shopping groups," such as families, who should count as a single shopping group. This helps provides more accurate conversion metrics, particularly when analyzing conversion rates for weekends and evenings, when shopping groups are more prevalent. In other implementations, the analytics component 150 distinguishes employees from customers, which can yield more accurate conversion numbers. The system 100 may also provide an image of each detected face, which can be used for future investigations and watch-list checks, as well as to respond to Be On the Lookout (BOLO) alerts and demographic analyses for marketing surveys.

In yet other implementations, the system 100 may be used to provide information to a workforce optimization (WFO) and/or workforce management (WFM) system to determine staffing levels.

Figure 2:
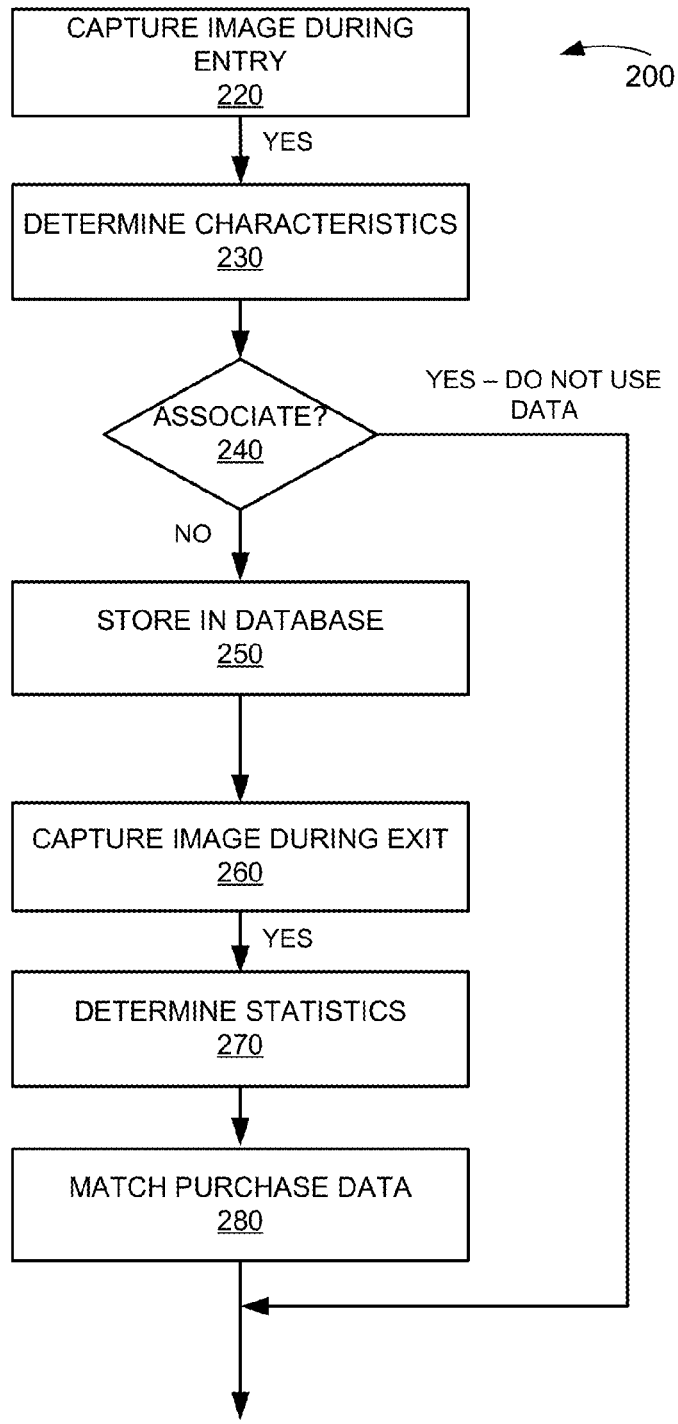
FIG. 2 illustrates an operation of a video system.
Figure 3:
FIG. 3 is an example field of view of a video source.

FIG. 2 illustrates a method 200 which may be implemented using the video system 100. Method 200 may include capturing an image during entry at 220. An image of a person entering the area may be captured by a video source or other device or system, as shown in FIG. 3.

Method 200 may also include determining characteristics of the image captured at 230. The characteristics may include, but are not limited to, facial characteristics, colors, hair, mouth, head shape, gender, age, body part characteristics, and/or other characteristics, and/or combinations thereof. In addition, the detected faces may be indexed and placed into a central database, and enhanced with transaction information.

Figure 4:
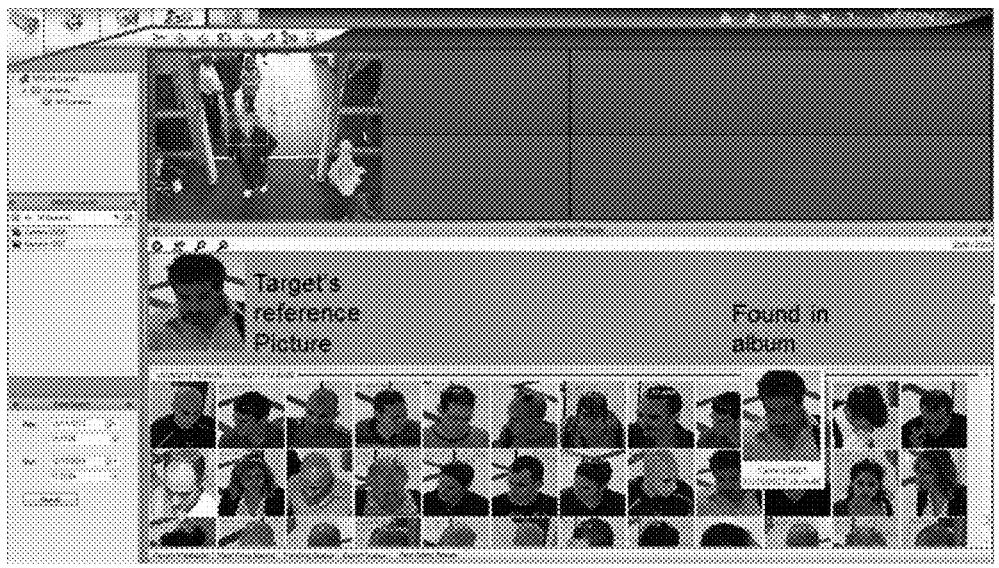
FIG. 4 is an example face album.

A face album 400 may be created from the video to enhance the accuracy of the counting and time monitoring of patrons entering and exiting an area or retail establishment. As shown in FIG. 4, the face album 400 may be a gallery of facial images that are captured by a video system and may be presented in a thumbnail interface. The face album 400 may provide an indication that person's face captured by the video source 101 already exists in the database, or that the person has some special characteristic (e.g., is wanted by law enforcement). As the patron enters the location an album face capture may take place. When the patron exits another face capture may take place. This may facilitate measuring the amount of time a patron spends in the location, and may also enhance the accuracy of the count of people in the area, and may be used for other purposes including staffing and customers needing assistance. In some cases, associates, or workers, in the location may be captured by the system. The face album 400 may facilitate identifying them as associates such that they may not be counted, and/or the time spent in the area is not used.

Method 200 may include determining if the image captured is a store associate at 240. The determining may be based upon at least one characteristic. The characteristics are noted above. In some implementations, full body images of the associates may be analyzed from head to toe and each body part may be profiled. The profiling may be accomplished by assigning a color to each body part. An analytics component 150 may then differentiate customers from the associates using knowledge of the profiled associates. Once an associate is identified, the associate may be tracked and/or identified by the system 100 as an associate in a visual display.

If it is determined that a particular captured image includes an associate, the data is not stored and/or statistics are not calculated for that captured image. If it is determined that a captured image is not an associate, the captured data and characteristics may be stored in a database at 250.

Method 200 may include capturing an image during exit of the area at 260. This captured exit image may be compared to, and matched up with, the captured entry image. Once this occurs, statistics may be determined 270, such as, but not limited to, the amount of time the person was in the area, and that the person has left the area. A comparison of entrance face recognition with exit face recognition may be performed to determine a length of time a person was in the store. This may be used for marketing and workforce management.

In addition, implementations of the present disclosure may be used to provide central retention of visual evidence; reduced investigation time due to transaction, face and video availability in a single application; linkage of investigated cases based on face matching (e.g., match faces even though the subject may be wearing different hats, hairstyles, etc. in several different facial images); and detection of suspects' activity regardless of the transaction info or used identity. For example, at 280, purchase data may be matched with the image to assist in marketing, and theft determination, among other uses.

In accordance with some implementations, a determination of the number of people who entered and/or exited a store may be provided to a central database, a store manager, corporate offices, etc. The determination may be communicated on a periodic basis, e.g., every 15 minutes. The count of the number of people may be used for workforce planning. Further, implementations herein may be used to determine if a customer is in need of assistance, if an associate is adhering to their assigned departments, and for determining a ratio of associates to of customers.

In an aspect of the present disclosure, the system 100 may implement face finder features. Face detection may be used to, e.g., identify criminals in a crowd. The goal of face detection systems is to quickly find suspicious faces in populated environments, such as streets, stadiums, train platforms, airport terminals and other densely occupied areas. There are many challenges with face detection, as the angle of the camera and the position of the face are very important to the success of the detection process. Many face detection technologies require that the person being detected look straight into the camera field-of-view in order for the camera to acquire a view of the subject's eyes. This contrasts with the reality that the video sources 101 often are places to detect people during their everyday activities—on the streets, during sports events, and more. Therefore, the risk of not catching the suspect in a front pose is quite high. Further, conventional detection engines have difficulty detecting faces when people are looking sideways.

The system 100 overcomes the challenges faced by conventional face detection solutions by detecting features of the face and head (e.g., eyes, hair, nose, etc.) from video sources 101 that are installed above walking gates, doors, and passages such as stadium entrances or airport passages. The images are saved to the database and may be provided to an operator or investigator in the face album 400 to scan and find relevant suspects. In accordance with the present disclosure, the database of collected faces may be used for retroactive face searching (time, specific camera, specific area etc.).

Normally, the human eye can review a few faces per second and filter-in/out other known image features of a suspect, such as glasses, a hat or a cap, shirt color and more. The process of identifying a suspect becomes faster and more reliable when the system 100 is used because the detected faces are provided to the operator in the face album 400.

Figure 5:
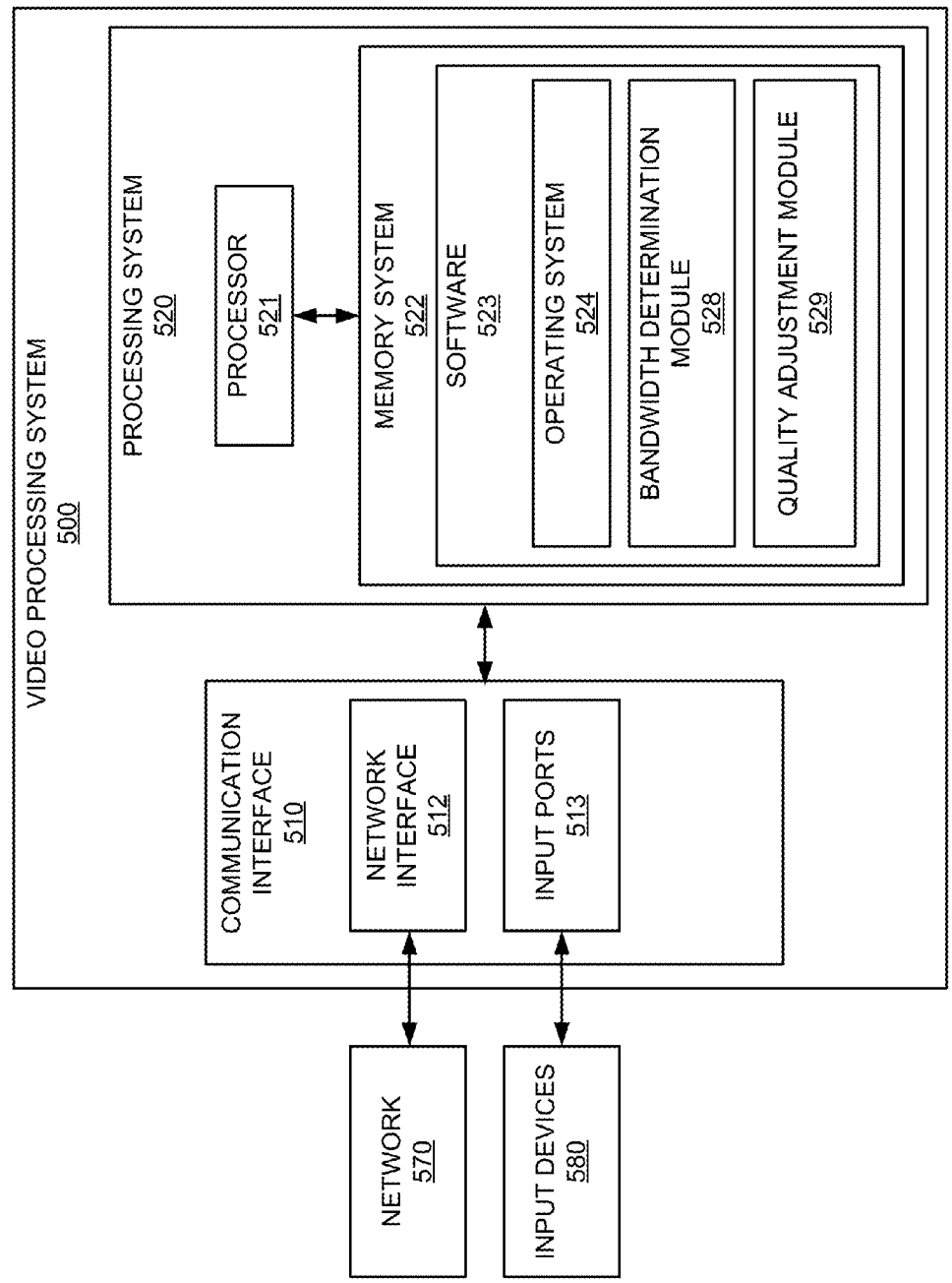
FIG. 5 illustrates a video processing system.

FIG. 5 illustrates video processing system 500. Video processing system 500 includes communication interface 510 and processing system 520. Processing system 520 is linked to communication interface 510 through a communication link. Processing system 520 includes processor 521 and memory system 522.

Communication interface 510 includes network interface 512 and input ports 513. Communication interface 510 includes components that communicate over communication links, such as network cards, ports, RF transceivers, processing circuitry and software, or some other communication device. Communication interface 510 may be configured to communicate over metallic, wireless, or optical links. Communication interface 510 may be configured to use TDM, IP, Ethernet, optical networking, wireless protocols, communication signaling, or some other communication format, including combinations thereof.

Network interface 512 is configured to connect to external devices over network 570. Input ports 513 are configured to connect to input devices 580 such as a video source (cameras), or other input devices.

Processor 521 includes microprocessor and other circuitry that retrieves and executes operating software from memory system 522. Memory system 522 comprises software 523. Memory system 522 may be implemented using random access memory, read only memory, a hard drive, a tape drive, flash memory, optical storage, or other memory apparatus.

Software 523 comprises operating system 524, bandwidth determination module 528, and quality adjustment module 529. Software 523 may also comprise additional computer programs, firmware, or some other form of non-transitory, machine-readable processing instructions. When executed by processor 521, software 523 directs processing system 520 to operate video processing system 500 to transmit reduced quality video when bandwidth is limited and increased quality video when bandwidth allows using bandwidth determination module 528 and quality adjustment module 529.

It should be understood that the functions and features of video processing system 500 illustrated in FIG. 5 may be implemented in or performed by video processing system 110, video source 101, by another device, or the functions may be distributed across multiple devices. Furthermore, system 500 may be used to implement the method 200 of FIG. 2, and/or any other method or system described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed:

1. A method for detecting a person, comprising:
   receiving, by a video processing system, video captured by a video source at a predetermined location, wherein the video source captures video containing people passing through a field of view of the video source at the predetermined location;
   processing the video, by the video processing system, to determine at least one bodily characteristic of each person passing through the field of view of the video source, wherein the at least one bodily characteristic includes hair;

storing, by the video processing system, a face image of each person in a database, the facial image being from the video, wherein the image is stored in the database in accordance with the at least one bodily characteristic;

determining, by the video processing system, if each person is a customer or store associate based upon the at least one bodily characteristic;

creating, by the video processing system, a face album comprising a plurality of face images, wherein each of the plural face images is of a unique face retrieved from the database; and providing, by the video processing system, the face album to a user interface for display, wherein the plurality of face images of the face album are displayed in a thumbnail view by the user interface.

2. The method of claim 1, wherein the at least one bodily characteristic further includes head shape and body part characteristics.

3. The method of claim 1, further comprising differentiating customers from the store associates using knowledge of the profiled associates.

4. The method of claim 1, further comprising tracking movement of the store associate.

5. The method of claim 1, further comprising tracking movement of the customer.

6. The method of claim 5, further comprising determining if the customer is part of a shopping group, wherein the shopping group comprises a family of two of more customers.

7. The method of claim 1, wherein the only images stored in the database are images that were determined to be of customers and not of store associates.

8. The method of claim 1, wherein the field of view is an entrance or an exit of a store.

9. The method of claim 8, further comprising comparing a face image of the customer captured at the entrance with a face image of the customer captured at the exit to determine a length of time the customer was in the store.

10. A method for detecting a person, comprising:
receiving, by a video processing system, video captured by a video source at a predetermined location, wherein the video source captures video containing people passing through a field of view of the video source at the predetermined location;

processing the video, by the video processing system, to determine bodily characteristics of the people passing through the field of view of the video source to determine a face of each person in the video, wherein the bodily characteristics include hair;

storing, by the video processing system, an image of the face of each person in a database;

creating, by the video processing system, a face album comprising a plurality of face images, wherein each of the plurality of face images is of a unique face retrieved from the database; and providing, by the video processing system, the face album to a user interface for display, wherein the plurality of face images of the face album are displayed in a thumbnail view by the user interface.

11. The method of claim 10, wherein the bodily characteristics further include head shape.

12. The method of claim 10, further comprising providing within the face album an indication that a face associated with at least one of the plural images is associated with a person wanted by law enforcement.

13. A non-transitory tangible computer readable medium containing computer executable instructions that when executed by a processor of a computer cause the computer to perform a method, comprising:
receiving, by a video processing system, video captured by a video source at a predetermined location, wherein the video source captures video containing people passing through a field of view of the video source at the predetermined location;

processing the video, by the video processing system, to determine at least one bodily characteristic of each person passing through the field of view of the video source, wherein the at least one bodily characteristic includes hair;

storing, by the video processing system, a face image of each person in a database, the facial image being from the video, wherein the image is stored in the database in accordance with the at least one bodily characteristic;

determining, by the video processing system, if each person is a customer or store associate based upon the at least one bodily characteristic;

creating, by the video processing system, a face album comprising a plurality of face images, wherein each of the plural face images is of a unique face retrieved from the database; and providing, by the video processing system, the face album to a user interface for display, wherein the plurality of face images of the face album are displayed in a thumbnail view by the user interface.

14. The non-transitory tangible computer readable medium of claim 13, wherein the at least one bodily characteristic includes head shape.

15. The non-transitory tangible computer readable medium of claim 13, further comprising instructions for differentiating customers from the store associates using knowledge of the profiled associates.

16. The non-transitory tangible computer readable medium of claim 13, further comprising instructions for tracking movement of the customer.

17. The non-transitory tangible computer readable medium of claim 16, further comprising instructions for determining if the customer is part of a shopping group, wherein the shopping group comprises a family of two of more customers.

* * * * *